Jan. 23, 1968
P. USALIS
3,365,190
SPRING CONSTRUCTION
Filed Sept. 27, 1965
3 Sheets-Sheet 1
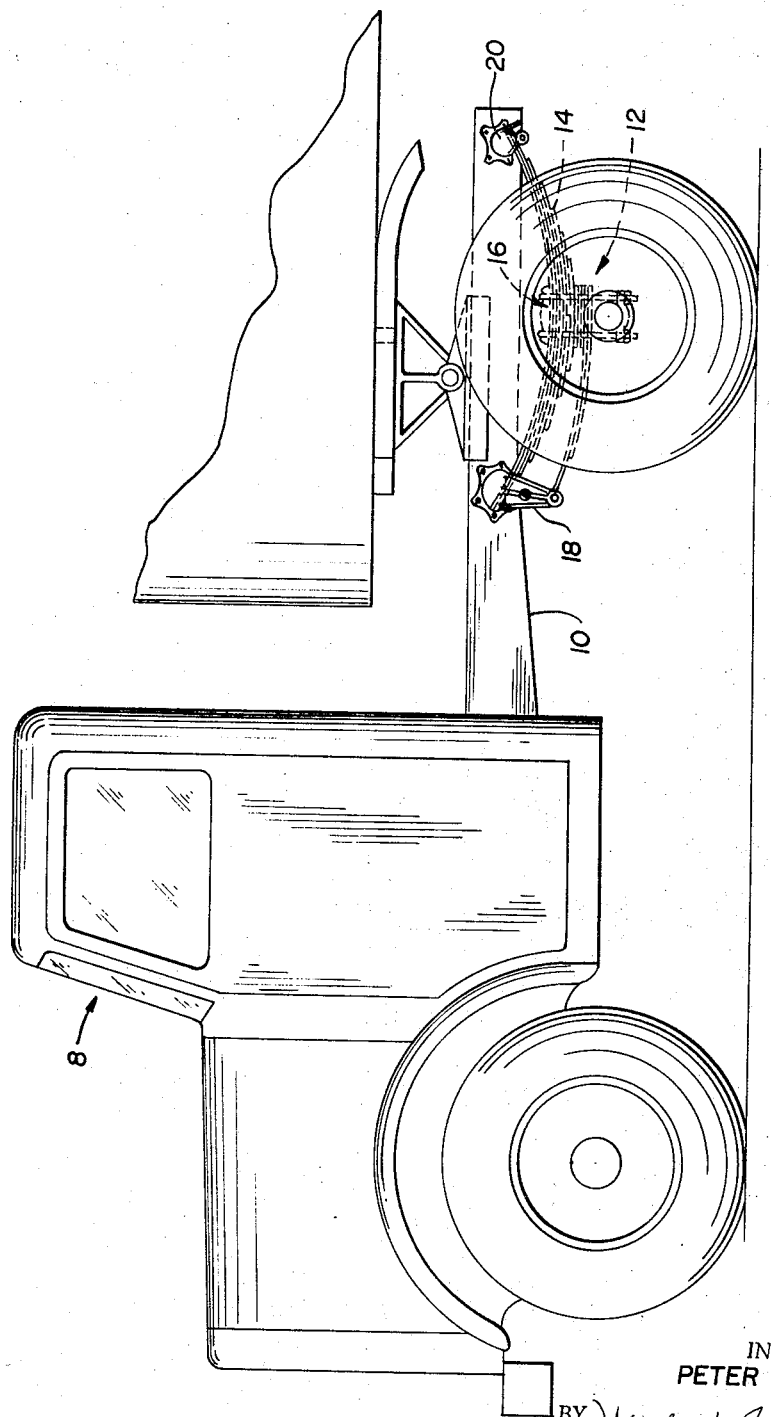
Fig. I
INVENTOR.
PETER USALIS
BY *Walls & Fisher*
ATTORNEYS

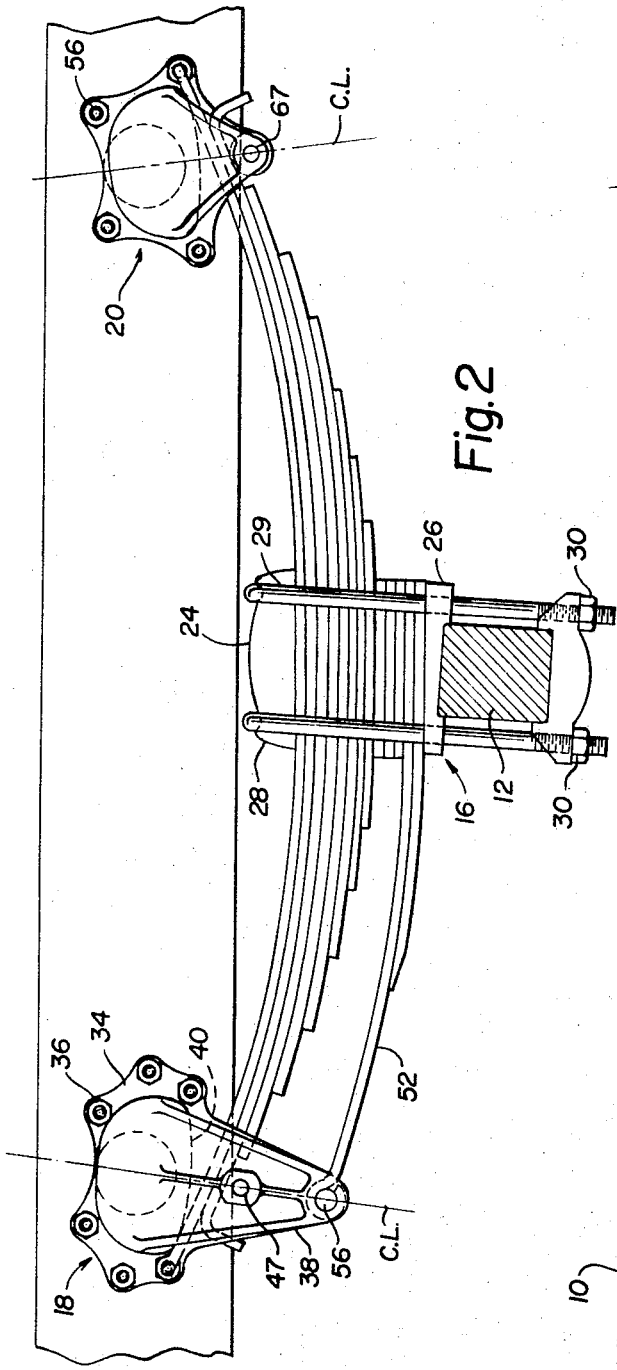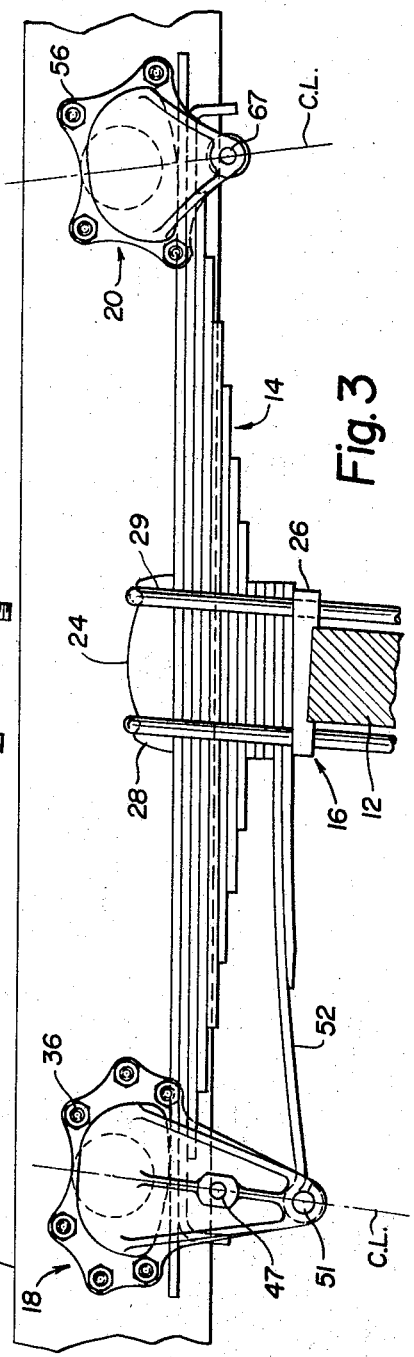

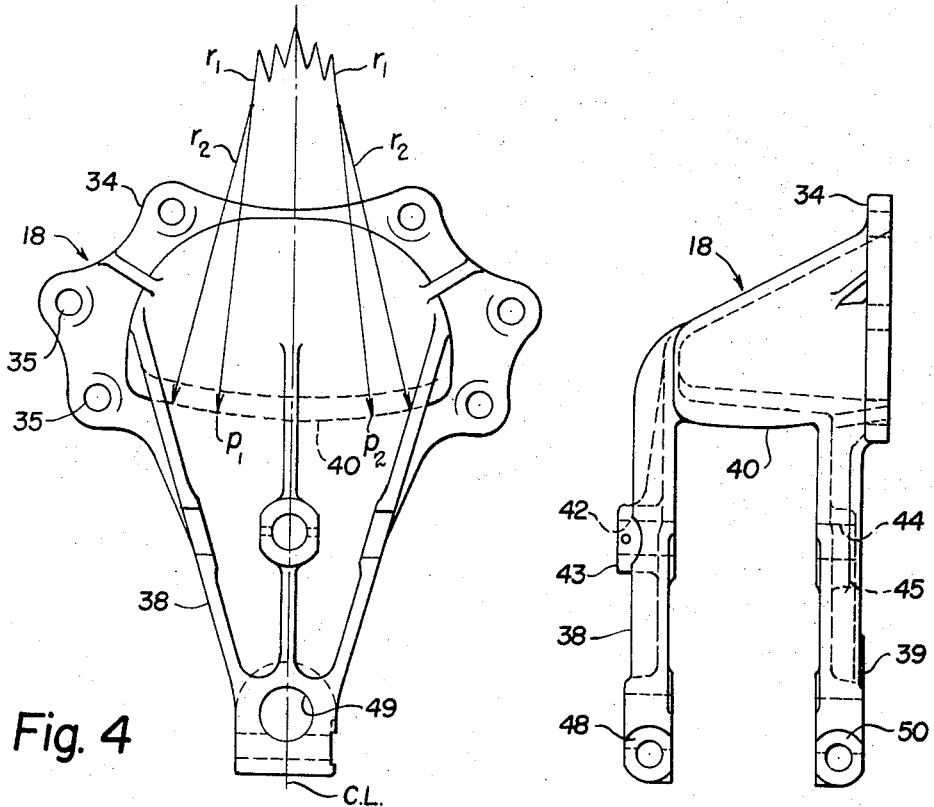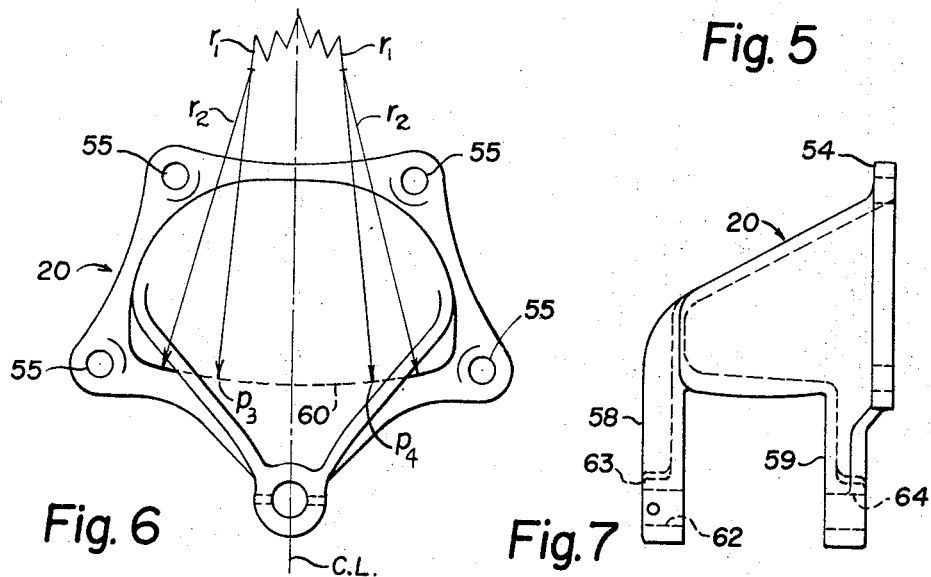

United States Patent Office 3,365,190
Patented Jan. 23, 1968

3,365,190
SPRING CONSTRUCTION
Peter Usalis, Cleveland, Ohio, assignor to White Motor Corporation, Cleveland, Ohio, a corporation of Ohio
Filed Sept. 27, 1965, Ser. No. 490,193
16 Claims. (Cl. 267—54)

ABSTRACT OF THE DISCLOSURE

A spring hanger or bracket for fastening to the side of a frame member of a vehicle. The bracket has a load bearing surface symmetrical with respect to the centerline of the bracket and is positioned on the frame member with the centerline at an angle from the vertical. The same bracket can be used on either side of the vehicle.

Disclosure

This invention relates to a spring construction, and more specifically to a mounting arrangement for a variable rate leaf spring.

Leaf springs find considerable use in motor vehicles, particularly to cushion the chassis of the vehicle from road vibrations that otherwise would be transmitted from the wheels and axle to the frame elements. In one common leaf spring arrangement, a spring is provided adjacent each side of the chassis above an axle of the vehicle. The springs provide a resilient coupling between the frame and axle. Each spring extends longitudinally of the chassis, i.e., parallel to the general direction in which the vehicle moves, and transversely of the vehicle axle. Each end of the spring is mounted in a spring bracket or hanger fastened to the frame of the chassis. The axle of the vehicle is attached to the leaves of the spring midway between the ends of the leaves by a bracket.

Under light vehicle loads, each leaf spring unit is curved concave upward to a relatively large extent. Under heavier loads, the leaves of the spring tend to straighten and may achieve a relatively flat configuration.

In many installations the spring hangers or brackets on the chassis are supported upon the ends of the leaf spring, but are not secured to the spring in fixed relationship. This allows the point of contact between spring and mounting brackets to change in response to spring deflection. Thus, as the spring straightens under load, the effective length of the spring leaves diminishes because the arc between the two fixed brackets on the frame is more shallow and, hence, the arc length is shorter.

In general, a change in effective spring length in response to variations in loads is desirable. It results in a stiffer spring when heavy loads are involved and a longer, more resilient, spring when relatively light loads are involved. This is especially true in heavy duty trucks where the load supported by a spring will vary greatly. Ideally, such change in effective length is accomplished without relative sliding movement between the spring brackets and the spring in order to prevent wear. This result can be achieved by shaping the contour of the spring engaging portion of each spring bracket so that the relative change in posiiton of the contact area between the spring and bracket during spring flexure is accomplished by relative rocking movement between the spring and bracket.

In accordance with the present invention, a novel spring hanger or bracket construction is provided that allows the location of contact between the bracket and the leaf spring to change with little or no relative sliding between the two members. Furthermore, the bracket is constructed symmetrically; that is, with a load bearing surface for contacting the spring symmetrically positioned with respect to the centerline of the bracket. This symmetrical bracket is then mounted at a predetermined angle to the chassis so that the load bearing surface is generally tilted downwardly from the horizontal, toward the center of the leaf spring, so as to extend more nearly along the arc of the adjacent spring leaves when under light load. With this construction and arrangement, the same front spring bracket and the same rear spring bracket for each spring may be used on either side of a motor vehicle chassis, in a mirror-image position. Also, because of the symmetry, the normal mirror-image pattern of mounting holes on each side frame element of the chassis is maintained. Therefore, special patterns and fabricating procedures are not required to facilitate mounting the brackets in proper position. This construction therefore reduces by one-half the number of types of parts needed, the inventory, the pattern expense, and other costs incident to parts complication. Moreover, in many installations, for example, where no stabilizing leaf or radius rod is attached to the front bracket, the same bracket may be used in all four positions; i.e., at each end of the spring and on both sides of the vehicle. In such cases the number of types of parts may be reduced to one-fourth the prior number.

The load bearing surface of each bracket, which coacts with the leaf spring, is constructed of two or more different radii of curvature. A central portion of the surface is of longer radius of curvature and is bisected by the centerline of the bracket. End portions of shorter radii of curvature form continuations of the central portion. This composite curvature, its position on the bracket, and the angle at which the bracket is mounted to the frame, provide for a rocking, i.e., rolling, contact between the spring and bracket as the spring is flexed. The symmetrical position of the bracket surface, the symmetrical construction of the bracket and the mounting of the bracket at an angle from the vertical permit the same bracket to be used on both sides of the vehicle and at either end of the spring. Furthermore, with this construction and arrangement, the change in the location of contact between the spring and bracket utilizes a major portion of the load bearing surface of the bracket. That is, the location of a line of contact between the spring and the bracket surface is on one side of the centerline of the bracket when the spring is relatively unloaded and is on the other side of the centerline when the spring is substantially straight. Thus, one part of the load bearing surface of the bracket is utilized on both sides of the chassis.

Accordingly, the object of the invention is to provide a novel and improved leaf spring and bracket construction.

Other objects, advantages and features of this invention will become better understood by reference to the following detailed description, in connection with the accompanying drawings, in which:

FIGURE 1 is a diagrammatic side elevational view of a truck showing the general arrangement of the rear axle spring;

FIGURE 2 is a side elevation view, partly in section, diagrammatically illustrating a variable rate leaf spring mounted in accordance with the present invention, and showing the spring as it appears under a lightly loaded condition;

FIGURE 3 is a side elevation view of the spring unit shown in FIGURE 2 when subjected to a relatively heavy load;

FIGURE 4 is a side elevational view of a front spring bracket of the type shown in FIGURE 2 of the drawings, and constructed in accordance with the present invention;

FIGURE 5 is an end elevational view of the spring bracket of FIGURE 4;

FIGURE 6 is a side elevational view of a rear spring bracket, as shown in FIGURE 2 of the drawings, and constructed in accordance with the present invention; and FIGURE 7 is an end elevational view of the spring bracket of FIGURE 6.

Referring now to the drawings, a conventional truck 8 is shown in FIGURE 1. A horizontal frame element 10 extends longitudinally on each side of the chassis of the truck. A rear axle housing 12 is located beneath the frame member 10 and extends transversely thereof. See FIGURES 2 and 3. A semi-elliptical leaf spring 14 connects the rear axle housing 12 with the frame member 10.

The rear axle housing 12 is fixedly attached to a central portion of the leaf spring 14 by a center clamp, indicated generally at 16. The leaf spring 14 extends transversely of the axle housing 12, parallel to the frame member 10, and at one end engages a front mounting bracket 18 and at the other end engages a rear mounting bracket 20.

The center clamp 16 includes a lower clip plate 22 that engages a bottom portion of the axle housing 12, and an upper clip plate 24 that engages a central portion of the top leaf of the spring 14. A spring seat 26 is interposed between the upper surface of the rear axle housing 12 and the lowermost central portion of the leaf spring 14. A pair of spring positioning bolts 28, 29 encircle the upper clip plate 24 and the leaf spring 14 on each side of the rear axle housing 12. The downwardly extending legs of the spring U-bolts 28 and 29 pass through the spring seat 26 and lower clip plate 22. The terminal end of the each leg of the spring U-bolt includes a threaded portion that receives a bolt 30. When tightened, the bolts 30 clamp the spring 14 to the axle housing 12.

The front mounting bracket 18 includes a mounting flange 34 having a plurality of mounting holes 35 symmetrically arranged about the center line CL of the bracket (see FIGURE 4). As shown in FIGURE 2, the mounting bracket 18 is secured to the frame member 10 by bolts 36. A pair of spaced, depending legs 38, 39 (FIGURE 5) extend from the bracket 18. These legs extend on each side of the front end of the leaf spring 14. A load bearing surface 40 spans the distance between the two legs 38, 39 adjacent the mounting flange 34. The load bearing surface 40 also extends for a substantial distance in the general direction of the extent of the spring 14. A through-bore 42 and a surrounding boss 43 are formed in a central portion of the depending leg 38, and a through-bore 44 and surrounding boss 45 are similarly located in depending leg 39 so that the bores are aligned. The bores 42 and 44 are adapted to receive a pin 47 (see FIGURE 2) that extends between the two legs 38, 39 and serves to locate the end of the spring 14 adjacent the load bearing surface 40. Similar through-bores 49, 50 at the bottommost portion of legs 38, 39 support a pin 51 to which a torque stabilizing spring leaf 52 is secured.

As best shown in FIGURE 4, the load bearing support surface 40 of the front mounting bracket 18 is constructed symmetrically about the centerline CL of the bracket. The portion of the surface 40 that engages the upper surface of the top leaf of the spring 14 is curved to two radii of curvature in the plane shown in FIGURE 4. A central portion of the surface, extending an equal distance on each side of the centerline, between the points indicated by the reference characters $p_1$ and $p_2$ in FIGURE 4, has a first radius of curvature $r_1$. The remaining portions of the load bearing surface 40 that come in contact with the spring 14 and which are located beyond the points $p_1$ and $p_2$ are formed with a smaller radius of curvature $r_2$. The radius of curvature $r_1$ is established from a point along the centerline CL of the surface 40 in the plane of the surface shown in FIGURE 3. Each radius $r_2$ is taken from a point along the radius $r_1$ that extends from the centerline to the point where the contour of the surface 40 changes from $r_1$ to $r_2$; i.e., at points $p_1$ and $p_2$. The radius $r_2$ is always less than the radius $r_1$ and in the embodiment shown, the radius $r_1$ is approximately twice as long as the radius $r_2$.

The construction of the rear mounting bracket 20 is shown in detail in FIGURES 6 and 7 of the drawings. The rear mounting bracket 20 is constructed essentially the same as the front bracket, except for the lack of a lower connection for a torque stabilizing spring. Thus, a mounting flange 54 is provided having symmetrically located mounting holes 55 spaced about the periphery. Bolts 56 (see FIGURE 2) fasten the bracket 20 to the frame 10. Laterally spaced depending legs 58, 59 extend from the main body portion of the bracket 20, adjacent the flange 54. A load bearing surface 60 spans the distance between the two legs 58, 59 and extends in the direction of the general extent of the spring 14. A through-bore 62 is located in a boss 63 in depending leg 58. A similar through-bore 64 extends through a boss 65 in depending leg 59. The two through-bores 62, 64 are aligned with each other to receive a pin 67 (see FIGURE 2) for retaining the end of the spring 14 adjacent the load bearing surface 60 of the mounting bracket 20.

The load bearing surface 60 is constructed the same as the load bearing surface 40 of the front mounting bracket 18. Thus, a central portion of the load bearing surface 60 extending in the general direction of the extent of the spring 14, on each side of the centerline between points $p_3$ and $p_4$, as shown in FIGURE 5, is formed to a curvature having a radius $r_1$ originating along the centerline CL. To each side of the central portion of radius $r_1$ is a flanking portion of a curvature having a shorter radius $r_2$. Each radius $r_2$ is established from a point along the radius line $r_1$ at the point adjacent $p_3$ and $p_4$ where the curvature of the surface changes from $r_1$ to $r_2$. The radius $r_1$ is approximately twice the length of the radius $r_2$ in the embodiment shown.

As shown in FIGURES 1 and 2, the front and rear mounting brackets 18 and 20 are each mounted on the frame member 10 at a slight angle from the vertical. Each is tilted the same amount as the other, but in an opposite direction, so that the load bearing surfaces 40 and 60, respectively, each depart from the horizontal in a general direction that more nearly approximates the direction that the adjacent end of the spring 14 extends when lightly loaded. That is, the load, bearing surfaces each tilt downward in an inward direction relative to each other and to the spring 14. The precise angle at which the brackets are tilted from the vertical depends upon the spring design, angles of between 4 and 8 degrees being typical for springs of the type disclosed herein.

A comparison of FIGURES 2 and 3, showing the spring 14 in a relatively unloaded and loaded configuration, respectively, illustrates that, while the mounting brackets remain fixed with respect to a frame 10, the area of contact between the spring 14 and the load bearing surfaces of the brackets change. In the unloaded position, the area of spring contact with each bracket 18 and 20 is to the outside of the centerline CL. See FIGURE 2. In the loaded position, where the spring 14 is flexed to a relatively flat or straight configuration, the area of contact between the spring 14 and the load bearing surface of each bracket is to the inside of the centerline of each bracket. See FIGURE 3. At degrees of flexure of the spring 14 intermediate the two positions shown in FIGURES 2 and 3, the area of contact between the spring and the load bearing surface progressively changes from the location shown in FIGURE 2 to the location shown in FIGURE 3. This change in position is not accomplished by a relative sliding movement between the load bearing surface and the spring 14, but rather, by essentially a rolling action of the spring upon the load bearing surface as the load bearing surface is lowered with the frame, due to an increased load, and as the spring 14 becomes straighter. As this change occurs, the effective length of the spring 14 progressively becomes shorter, and the spring thereby progressively becomes stiffer.

It will be readily apparent that a mirror image of the arrangement shown in FIGURES 2 and 3 is provided on the opposite side of the frame, so that the vehicle axle is mounted on each side of the frame. Because the front bracket 18 and the rear bracket 20 are both symmetrical, they may be mounted at the same appropriate angle on either side of the frame to present a load bearing surface of identical configuration. Moreover, a major portion of the load bearing surface will cooperate with the spring during flexure between the two extremes of flexure shown in FIGURES 1 and 2.

By way of example only, a suitable specific construction of pair of brackets and leaf spring is as follows:

Front and rear spring mounting brackets are constructed of the configuration shown in the drawings. The shape of the load bearing surface of each bracket is identical to the other. Each load bearing surface has a central portion of uniform curvature that extends on each of the centerline as shown in FIGURES 4 and 6 for a distance of 1¾ inches. That is, each point $p_1$, $p_2$, $p_3$, $p_4$ is 1¾ inches from centerline CL. This portion of the surface has a radius of curvature of 15 inches, with the center of the curvature being located on the center line of the bracket and above the load bearing surface in the orientation shown in the drawings. The load bearing surface extends beyond the central portion for a further distance of 1¾ inches on each side. These portions of the load bearing surface each have a radius of curvature of 7 inches, with the center of the curvature being located along the radius line of the central radius of curvature at the point where the radius of curvature changes, i.e., along the radius line intersecting the load bearing surface 1¾ inches from the center line of the bracket. At the point 3½ inches from the center line, beyond the area of contact between the spring and load bearing surface of the bracket, the load bearing surface terminates with a ½ inch radius of curvature, extending away from the spring surface.

Each mounting bracket is mounted on a horizontal frame with the centerline of the mounting bracket oriented at an angle of between 6 and 7 degrees and preferably 6 degrees and 38 minutes from the vertical. The front and rear brackets are each tilted in an opposite direction so that an extension of their center lines would converge at a point above the spring assembly, and thus the load bearing surfaces are tipped downwardly toward the center of the spring assembly, with respect to the horizontal.

The two spring mounting brackets are located so the distance between points 15 inches above the load bearing surfaces, along the centerlines of the brackets, is 46 inches.

These mounting brackets are used with a leaf spring having an effective span (i.e., effective spring length) between the brackets of approximately 56 inches under light load conditions as shown in FIGURE 2 of the drawings, and which has an effective span of approximately 46 inches when loaded to a flat configuration as shown in FIGURE 3 of the drawings. The center clamp and axle assembly is mounted at the center of the spring and deflects relative to the frame a distance of 4¾ inches between the light loaded position of FIGURE 2 and the loaded position of FIGURE 3.

With the spring in the light loaded condition as shown in FIGURE 2, the location of contact between the spring and the load bearing surface of each mounting bracket is adjacent the outside end of the load bearing surface of each mounting bracket, 3¼ inches from the centerline of the respective bracket. Under fully loaded conditions, as shown in FIGURE 3, the location of contact between the spring and the load bearing surface of each bracket is 1¾ inches to the inside of the centerline of each bracket.

The above described brackets have six symmetrically located mounting holes and are adaptable for use on either side of a vehicle chassis. The construction and arrangement facilitates a progressive change in effective spring length during flexure, essentially without slippage between the spring and load bearing surfaces of the brackets.

While a preferred embodiment of this invention has been described with particularity, it will be understood that numerous modifications or alterations may be made therein without departing from the spirit and the scope of the invention as set forth in the appended claims. Thus, while one specific relationship between the mounting brackets and the frame member has been disclosed, and a particular curvature of the load bearing surface that will provide varying points of contact between the surface and the spring during deflection of the spring without sliding has been provided, the precise curvature of the load bearing surface and the orientation of the spring mounting brackets will vary with different spring elements. However, regardless of such variations in precise curvature and orientation, by providing a load bearing surface that is symmetrical about the centerline of the bracket and by then tilting each bracket from the vertical, identical end brackets may be used on both sides of a frame without sacrificing the functional characteristics of the load bearing surface in providing a variable rate spring. Because the mounting holes and load bearing surface are symmetrical about the center line, a normal mirror image arrangement of holes in each of the supporting frame members facilitates the proper orientation of the brackets. Furthermore, by utilizing a substantial length of the load bearing surface, i.e., more than half, the length of the load bearing surface and hence the size of the spring hanger itself is minimized while yet retaining the ability to use the hanger on either side of the frame.

What is claimed is:

1. In a spring installation between an axle and a frame of a motor vehicle, two spaced brackets secured on only one side of an upright surface of a frame member, each bracket having a load bearing surface adapted to engage a spring element; an elongated spring element having a central portion and two ends, the central portion being secured to the axle and each of the two ends engaging the load bearing surface of a different one of said two spaced brackets; each said bracket being constructed symmetrically about a center line passing through and bisecting the load bearing surface and each being arranged with respect to the frame with the centerline oriented at an angle from the vertical.

2. In a variable rate leaf spring unit for use with a heavy duty truck, the combination of a truck frame having longitudinally extending frame members, front and rear spring hangers fastened to only one side surface of a longitudinally extending frame member at spaced locations, a spring unit extending between said hangers, an axle fixed to a central portion of the spring unit and extending transversely thereof, said front and rear spring hangers each being formed with a curved load bearing surface that bears against the spring unit at a spaced location from the other, said load bearing surface of each spring hanger being oriented symmetrically about a center line on the hanger and being so constructed and arranged to contact the spring unit at a location that changes with deflection of the spring unit with little or no relative sliding between the spring unit and load bearing surfaces.

3. The unit of claim 2 wherein each spring hanger is fastened to the frame with the center line about which the load bearing surface is symmetrical at an angle from the vertical so that the load bearing surface is tilted from the horizontal.

4. The unit of claim 3 wherein the spring under a light load is curved in an arc between the hangers, and the load bearing surface of each hanger is tilted on the frame from the horizontal, in more general alignment with the direction of the arcuate extent of the spring adjacent the hanger.

5. The unit of claim 4 wherein the load bearing surface of each hanger is formed of at least two radii of curvature.

6. The unit of claim 5 wherein one portion of the surface is of longer radius of curvature and is bisected by the centerline of the hanger and two portions of the surface are of shorter radii of curvature and are located contiguous with and to each side of the portion having the longer radius.

7. The unit of claim 6 wherein the longer radius is approximately twice as long as the shorter radii.

8. The unit of claim 7 wherein each hanger is tilted with the said centerline at an angle of between 6 and 7 degrees from the vertical.

9. The unit of claim 6 wherein the leaf spring unit, when loaded so as to be essentially straight, is in contact with the load bearing surface of each hanger on one side of the center line of the load bearing surface and, when unloaded, is in contact on the other side of the center line.

10. The unit of claim 4 wherein each hanger is tilted to the same degree.

11. The unit of claim 10 wherein the centerline of each hanger about which the load bearing surface is symmetrical extends at an angle of between 4 and 8 degrees from the vertical.

12. In a spring installation for connecting a vehicle frame to a transverse axle wherein the effective length of a leaf spring between two spaced spring mountings varies with the deflection of the spring and without relative sliding movement between the spring and mountings, the improvement which comprises a symmetrical construction of the two spring mountings, including a load bearing surface, a flat mounting surface in a plane transverse to the load bearing surface to be positioned on one side of a vehicle frame member and mounting holes through the mounting surface symmetrical about a center line of the mountings, so that the mountings can be reversed and thereby used on either side of the vehicle frame, and an attachment of each of the symmetrical mountings on the vehicle with the centerline of each mounting at an angle from the vertical.

13. The apparatus of claim 12 wherein the said angle is the same for both mountings but wherein each is angled in an opposite direction from the vertical.

14. The apparatus of claim 13 wherein the mountings are angled in a direction such that extensions of the center lines of the two mountings converge above the spring.

15. The apparatus of claim 14 wherein the load bearing surface of each mounting is constructed of a central portion of first radius of curvature and end portions of shorter radii of curvature.

16. A spring installation as set forth in claim 1 wherein the load bearing surface of each bracket are identical in contour.

References Cited

UNITED STATES PATENTS

| | | | |
|---|---|---|---|
| 1,892,668 | 1/1933 | Heiney | 267—54 |
| 2,411,337 | 11/1946 | Ridgway | 267—54 |
| 2,445,295 | 7/1948 | Pond | 267—54 |

ARTHUR L. LA POINT, *Primary Examiner.*

R. M. WOHLFARTH, *Assistant Examiner.*